US010058728B2

(12) United States Patent
Kelly (10) Patent No.: US 10,058,728 B2
(45) Date of Patent: Aug. 28, 2018

(54) WEIGHT BAR HOLDER (71) Applicant: Sean Kelly, Miami Beach, FL (US)

(72) Inventor: Sean Kelly, Miami Beach, FL (US)

(*) Notice: Subject to any disclaimer, the term of this patent is extended or adjusted under 35 U.S.C. 154(b) by 27 days.

(21) Appl. No.: 14/741,679

(22) Filed: Jun. 17, 2015

(65) Prior Publication Data
US 2018/0056108 A1    Mar. 1, 2018

(51) Int. Cl.
F16M 13/00 (2006.01)
A63B 21/072 (2006.01)
F16M 13/02 (2006.01)

(52) U.S. Cl.
CPC ......... *A63B 21/072* (2013.01); *F16M 13/022* (2013.01)

(58) Field of Classification Search
CPC .................. A63B 21/0628; A63B 21/078
USPC .............. 248/220.31, 220.41, 220.43, 200; 482/92, 94, 104
See application file for complete search history.

(56) References Cited

U.S. PATENT DOCUMENTS

| | | | |
|---|---|---|---|
| 4,492,375 A * | 1/1985 | Connelly | A63B 21/00072 482/130 |
| 5,346,448 A * | 9/1994 | Sollo | A63B 21/00181 482/104 |
| D444,827 S * | 7/2001 | Mobley | D21/694 |
| 7,338,416 B2 | 3/2008 | Smith | |
| 7,699,756 B2 * | 4/2010 | Piane, Jr. | A63B 1/00 248/222.52 |
| 8,337,370 B2 * | 12/2012 | Rogers | A63B 21/078 482/104 |
| 9,216,314 B2 * | 12/2015 | Chen | A63B 21/072 |
| 2009/0137368 A1 * | 5/2009 | Parrilla | A63B 21/078 482/104 |
| 2014/0200117 A1 | 7/2014 | Grider | |

\* cited by examiner

*Primary Examiner* — Steven M Marsh
(74) *Attorney, Agent, or Firm* — Nasser Ashgriz; UIPatent Inc.

(57) ABSTRACT

Weight bar holders to keep an Olympic or other type of weight lifting barbell or bar on the upright members or supports of a piece of fitness equipment, such that a maximal grip may safely and effectively utilized by the user of the equipment. The upright members of the fitness equipment having a plurality of apertures, said weight bar holder comprising of a body member connected to an extension element, said body having four surrounding walls; a bar support member being connected to said body from one of said surrounding walls; and an engagement member being connected to said extension element for securing within said plurality of apertures on said upright bar.

8 Claims, 8 Drawing Sheets

WEIGHT BAR HOLDER

FIELD OF THE INVENTION

The present invention relates generally to fitness and exercise equipment and especially to weight bar holders.

BACKGROUND OF THE INVENTION

Weight bar holders, also referred to as J-Hooks, are used to hold a barbell on the uprights, vertical posts or parts/members of a variety of different pieces of fitness equipment including and commonly known as: racks, multi-functional racks, power-racks, half racks, partial racks, squat racks, self-standing half racks, double half racks, triple combo racks, squat stands, all other combinations and forms of racks, cages, power-cages, smith machines, bench presses and various weight resistance machines. The bar holders are generally attached to the fitness equipment and are held firmly in place by inserting them into the upright posts or parts of the fitness equipment. They are used to horizontally hold a bar on a rack or fitness equipment at certain height and parallel to a level floor. The bar holders are typically adjustable on the rack or the fitness equipment uprights to various heights from the floor. This accommodates users of different heights and performance of various typed of exercises using the weight bar.

A weight bar holder or a J-Hook generally comprise of three different elements: a body member, a bar support member attached to one side of the body member to hold the barbell, and an engagement member on the other side of the body member to engage with the upright members of a fitness equipment. In the prior art, the bar support member is in the same plane as aligned with the upright bar member. Therefore, the grip length on the weight bar is equal to the distance between the two upright bar members or the width of the equipment.

The standard width of a power rack or a weight machine is approximately 47-50 inches. This is wide enough for most users. However, for a user with wide shoulders it may be difficult to perform certain exercises, such as low bar back squat, in such a width. Such users need a wider grip on the weight bar. A wider space on the weight bar may also protect user's fingers from being jammed between the weight bar and the upright posts or parts/members of the fitness equipment to which the bar holders are attached, especially during the de-loading of the barbell when a person returns it to the bar holders.

Therefore, there is a need for safely extending the practical grip length available to be used when a person loads and then de-loads a barbell from a rack or similar piece of fitness equipment. This is especially true for people with wide shoulders, who are recovering from injuries, or who have an inadequate shoulder range of motion, who wish to perform typical and common exercises using this fitness equipment.

SUMMARY OF THE INVENTION

The present invention is a weight bar holder or a J-hook for adjustably holding and supporting a weight bar within the upright bars of a variety of different types of fitness equipment including: racks, multi-functional racks, power-racks, half racks, partial racks, squat racks, self-standing half racks, double half racks, triple combo racks, squat stands, all other combinations and forms of racks, cages, power-cages, smith machines, bench presses and various weight resistance machines. Such fitness equipment include, in composition, two stationary upright members having a plurality of apertures or spaces, within which weight bar holders may fit into in order to hold a barbell at different heights. A weight bar holder is comprised of a body member, a barbell support member and an engagement member to engage with the apertures of the uprights.

The present invention is a novel J-Hook, in which its barbell support member and its engagement member with the uprights are in two different planes. The barbell support member is either on the right or the left side of the engagement member. This design provides an adjustable grip length in a fitness machine having a fixed width between its upright bars. The grip length is the length that a user uses to grip and lift a weight bar. The present weight bar holder allows for an increase or a decrease in the grip length on a barbell. The present weight bar holder allows for a wide range of grip lengths by having a changeable holding location of the weight bar. It also provides an additional level of safety for holding the weight bar on the bar holder.

The weight bar holder of the present invention that is selectively vertically positionable on an upright bar of a fitness equipment. The upright bar of the fitness equipment have a plurality of vertically aligned apertures, and the weight bar holder comprising:

a. a body having a front side, and a left or a right side;
b. a barbell-holder being connected to the front side of the body; and
c. an extension member being connected to the left or the right side of the body;
d. an engagement member being connected to the extension member and having an engagement means to engage with the upright bar, whereby the barbell-holders are reversible and extend on the right or the left side of the upright bar.

Other objects, advantages and novel features of the present invention will become readily apparent from the following drawings and detailed description of the preferred embodiments.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

FIG. 4 (a-c) show a lateral view, a front view and a back view of the weight bar holder of the present invention, FIG. 5 (a-b) show a back view of the weight bar holder of the present invention that engagement member is placed on a right side and a left side of the body member;

FIG. 6 (a-b) shows the perspective view of a back side of the weight bar holder of the present invention showing a locking means;

FIG. 8 (*a-c*) shows the difference between a prior art weight bar holder and the weight bar holders of the present invention.

DETAILED DESCRIPTION OF THE DRAWINGS

Figure 1:
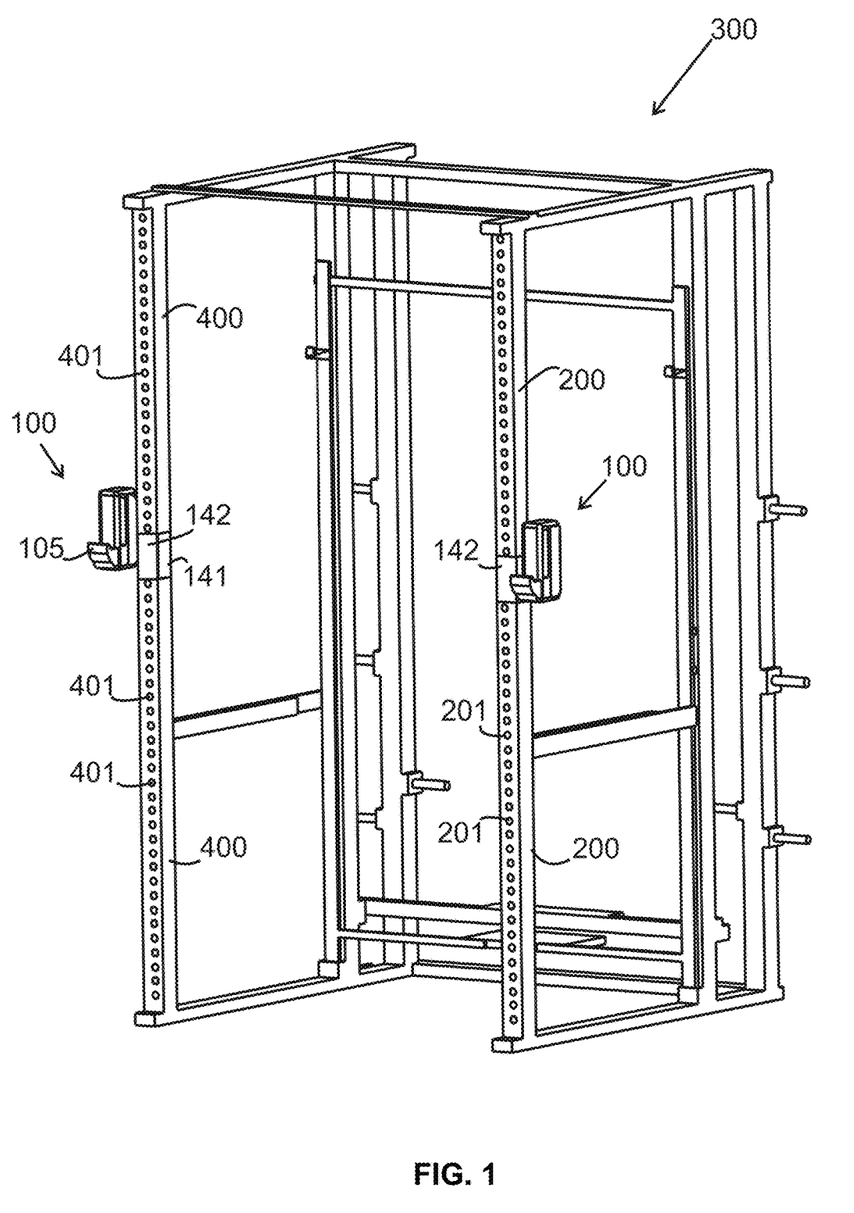
FIG. 1 shows a power rack device on which two weight bar holders of the present invention are installed, outside of the power rack cage.

FIG. 1 shows the weight bar holder 100 of the present invention installed on a power rack 300 having a first stationary upright member 200 having a plurality of apertures 201 and a second stationary upright member 400 having a plurality of apertures 401. The plurality of apertures 201 and 401 on upright members 200 and 400 engage with a weight bar holder 100 within two of the plurality of apertures 201 and 401 of the upright members 200-400.

The weight bar holder 100 in FIG. 1 increases the grip length on the weight bar. The bar support members 102 are placed outside of the cage 301 of the power rack 300 to help a user with wide shoulder to perform specific exercises with the power rack.

Figure 2:
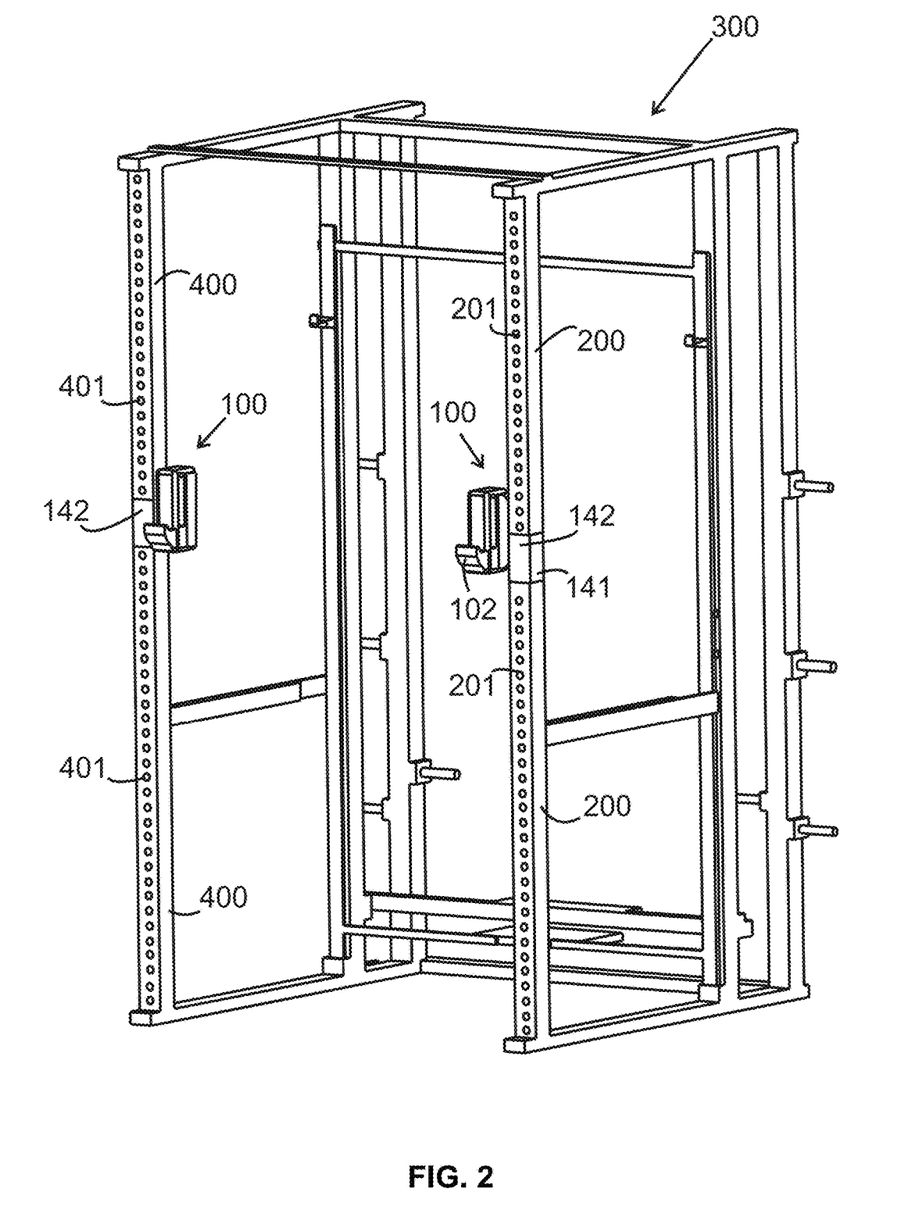
FIG. 2 shows a power rack device on which two weight bar holders of the present invention are installed, inside of the power rack cage.

FIG. 2 shows a power rack 300 with a pair of weight bar holders 100 installed on the stationary upright members 200 and 400. The weight bar holder 100 in FIG. 2 decreases the grip length on the weight bar. The bar support members 102 are placed inside of the cage 301 of the power rack 300 to help a user. This position allows for the user to safely and effectively utilize the maximum grip width on the bar, as his/her hands can now extend to the full length of the bar whereby grip is applicable. This "reversible" aspect and use of the bar holders of the present invention allows for variability on where the user prefers to hold the Olympic or other type of bar out of necessity or comfort or both.

Figure 3:
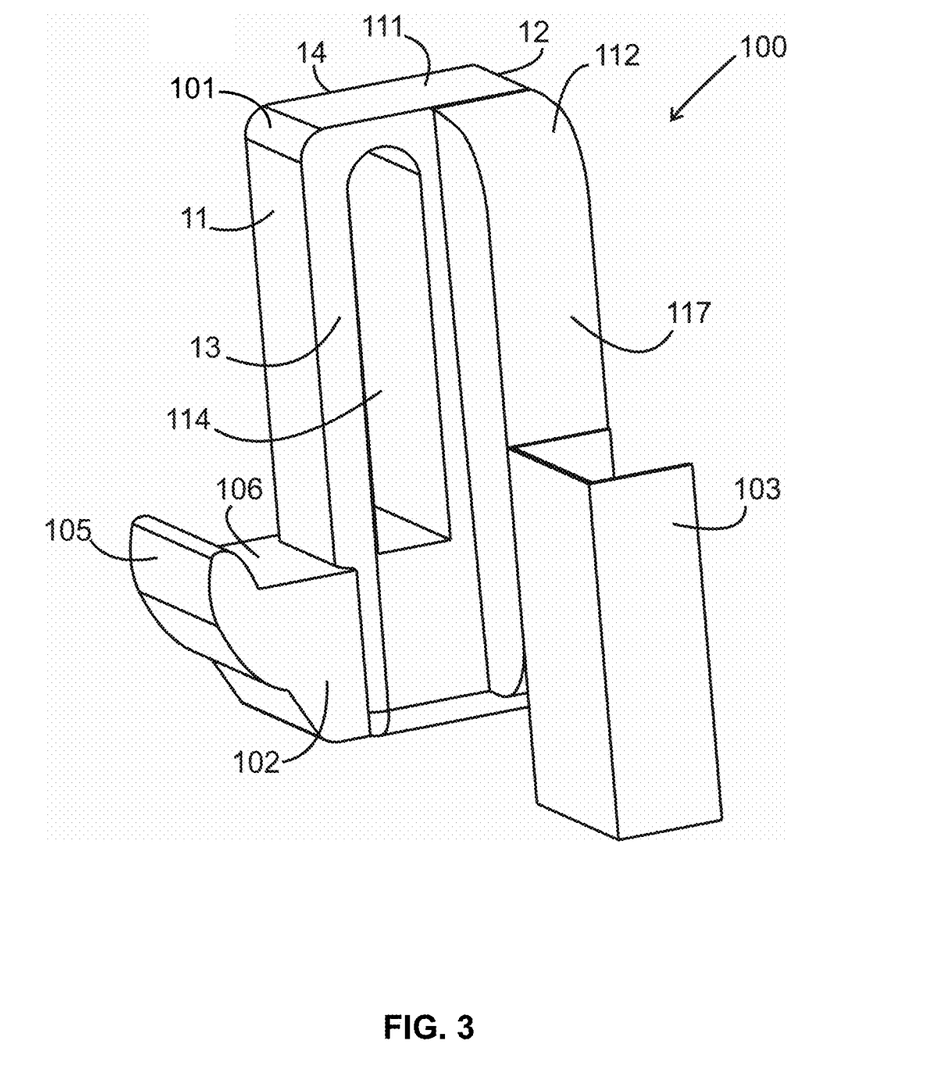
FIG. 3 shows a perspective view of the weight bar holder of the present invention.
Figure 4:
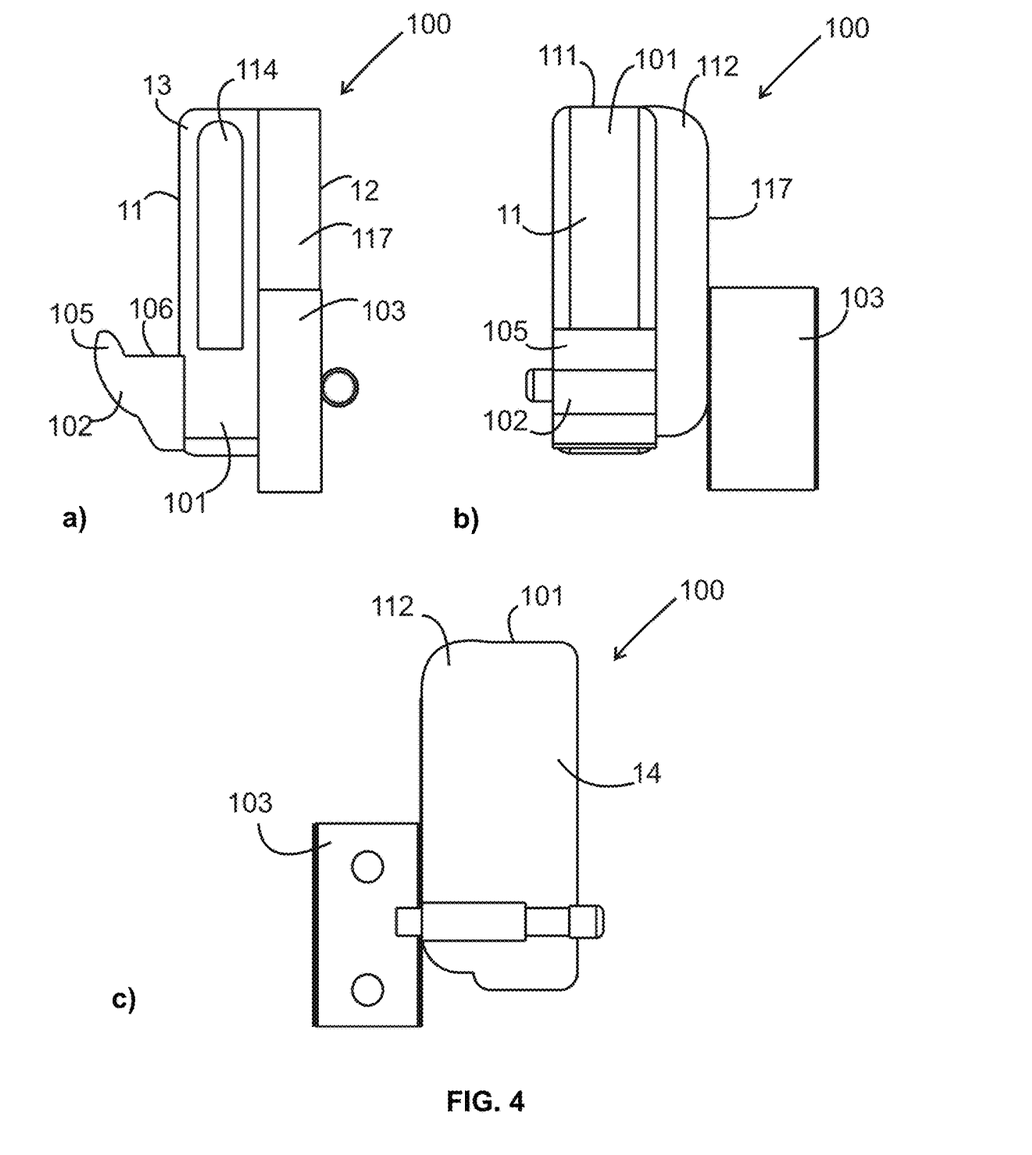
Figure 5:
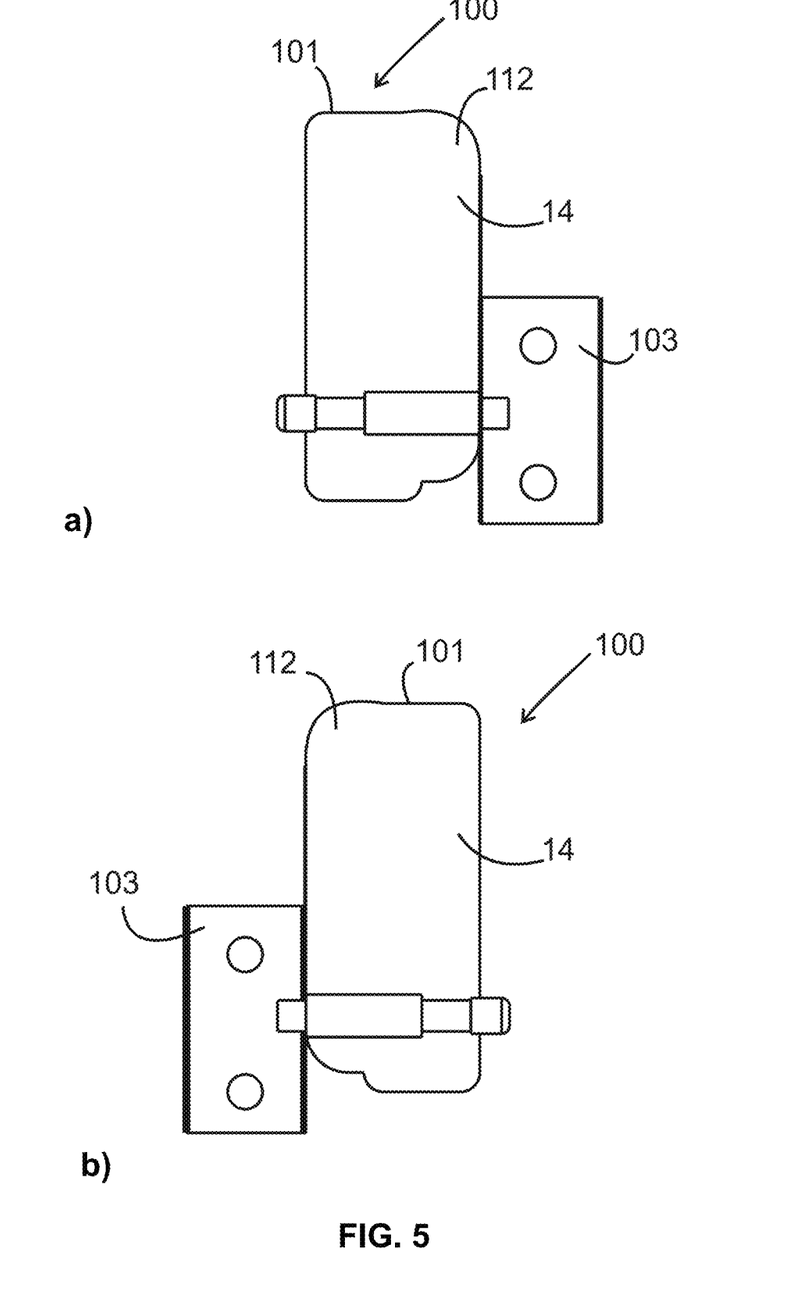

As shown in FIGS. 3-5, the present invention is a weight bar holder 100 having a body member 101, a bar support member 102, and an engagement member 103 for securing within two of the plurality of apertures 201-401 of a first and a second upright members 200 and 400.

Again referring to FIG. 3, the body member 101 of the weight bar holder 100 comprises of a parallelepiped part having four surrounding walls 11, 12, 13, 14. The bar support member 102 is connected to the bottom of the surrounding walls 11 of the body member 101. The bar support member 102 is responsible to keep the weight bar on the upright members 200 and 400. The bar support member 102 has a catching edge 105 to prevent the weight bar from falling when it sit on the sitting surface 106 of the bar support member 102. The bar support member 102 can be installed at different heights on the surrounding wall 11.

Again referring to FIGS. 3-5, the engagement member 103 is connected to an extension part 112 on the surrounding wall 13 of the body member 101. The engagement member 103 can be connected to the extension part 112 at different heights.

Referring again to FIG. 5, the engagement member 103 being connected to the right side (FIG. 5 (*a*)) or a left side FIG. 5 (*b*) of the body member 101 to increase the grip length on the weight bar.

Again as shown in FIGS. 3-5, the body member 101 of the weight bar holder 100 comprises of a parallelepiped part 111 and an extension part 112. The parallelepiped part 111 being connected to the bar support member 102 from a faced side 11. The parallelepiped part 111 having an opening 114 on a right wall 13 and connected to the extension part 112 from the right wall 13. The extension part 112 being connected to the engagement member 103 from the lateral side 117. The length of the extension part 112 can vary to provide different grip lengths on the weight bar.

Again as shown in FIGS. 3-5, the purpose of having the opening 114 constructed on the right wall 13 is to act as a handle to carry the weight bar holder and to help in placing the weight bar holder in a proper location during de-loading on the stationary or movable upright members.

Figure 6:
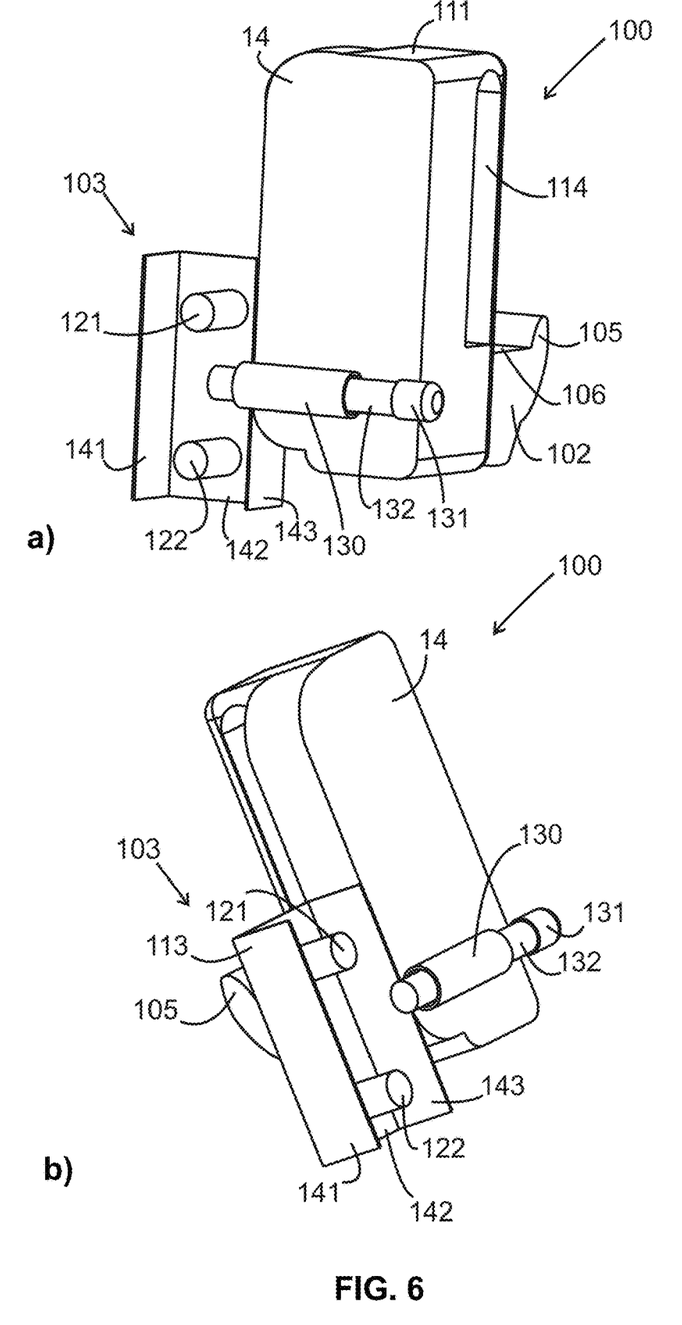
Figure 7:
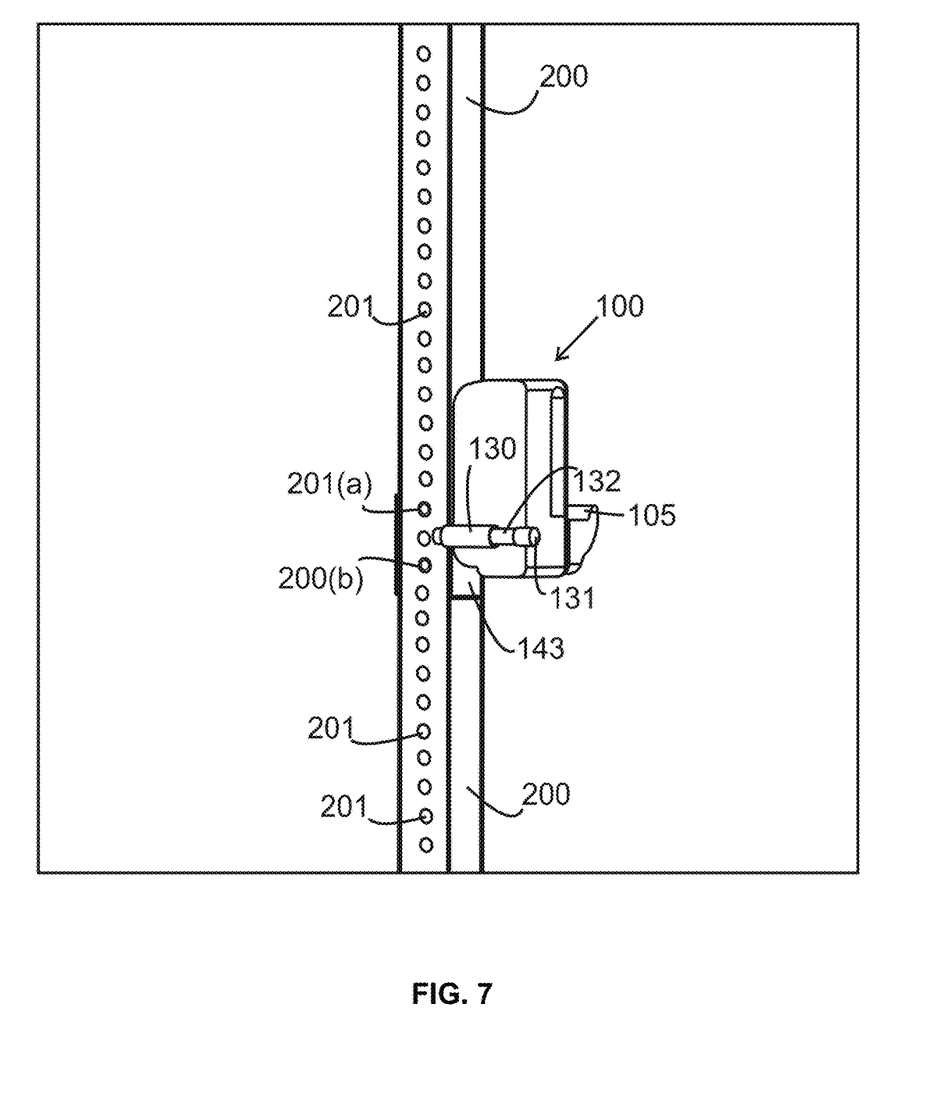
FIG. 7 shows an upright bar member of fitness equipment with a plurality of apertures and the weight bar holder of the present invention installed on the upright bar member.

A back side of the bar holder 100 is shown in FIGS. 6-7. The engagement member 103 comprises of a C-shaped body 103 having three walls 141-143. The width between two lateral walls 141 and 143 is the same as the width of the stationary or movable upright members 200 on the fitness equipment. The two short cylinders 121-122 attached on the inner faced wall 142 are sized to receive a plurality of apertures 201 on the stationary or movable upright members 200 of the fitness equipment. A locking means 130 is provided to prevent the weight bar holder 100 from sliding and moving on the upright member 200.

Again referring to FIGS. 6-7, the locking means 130 comprises of a cylindrical rod 132 equipped with a spring (not shown) inside a cylindrical tube 130. The user can pull out a handle 131 on the distal end of the cylindrical rod 131 and put the weight bar holder 100 on the upright member 200. The proximal end of the cylindrical rod 132 is designed to be engaged with the upright member 200 to prevent the weight bar holder 100 to move forward.

As shown again in FIGS. 6-7, the weight bar holder of the present invention have the engagement member comprising of a three sided sleeve 141-143 sized to receive the upright bar 200, the sleeve having a front wall 142, a right wall 143 and a left wall 142, said front wall 142 having a back side; and a plurality of cylindrical pegs 121-122 projected outwardly from the back side of the front wall 142, said pegs 121-122 sized to engage with the apertures 201 on said upright bar 200; and a locking means 130 to lock said weight bar holder 100 onto the upright bars 200.

In one embodiment of the present invention, the extension member of the weight bar holder is a rectangular cuboid having a length, a width and a depth. The width of the extension member having different length preferably from 1 inch to 10 inches.

As shown in FIGS. 1, 2, 7 and 8, the fitness equipment, such as racks, multi-functional racks, power-racks, half racks, partial racks, squat racks, self-standing half racks, double half racks, triple combo racks, squat stands, all other combinations and forms of racks, cages, power-cages, smith machines, bench presses and various weight resistance machines, comprises of a first movable upright bar 200 having a plurality of apertures 201 and a second movable upright bar 400 having a plurality of apertures 401. The plurality of apertures 201 and 401 on upright members 200 and 400 being engaged with a weight bar holder 100 by the engagement member 103 for securing within two of the plurality of apertures 201 (*a*), 201 (*b*) on the upright member 200.

Figure 8:
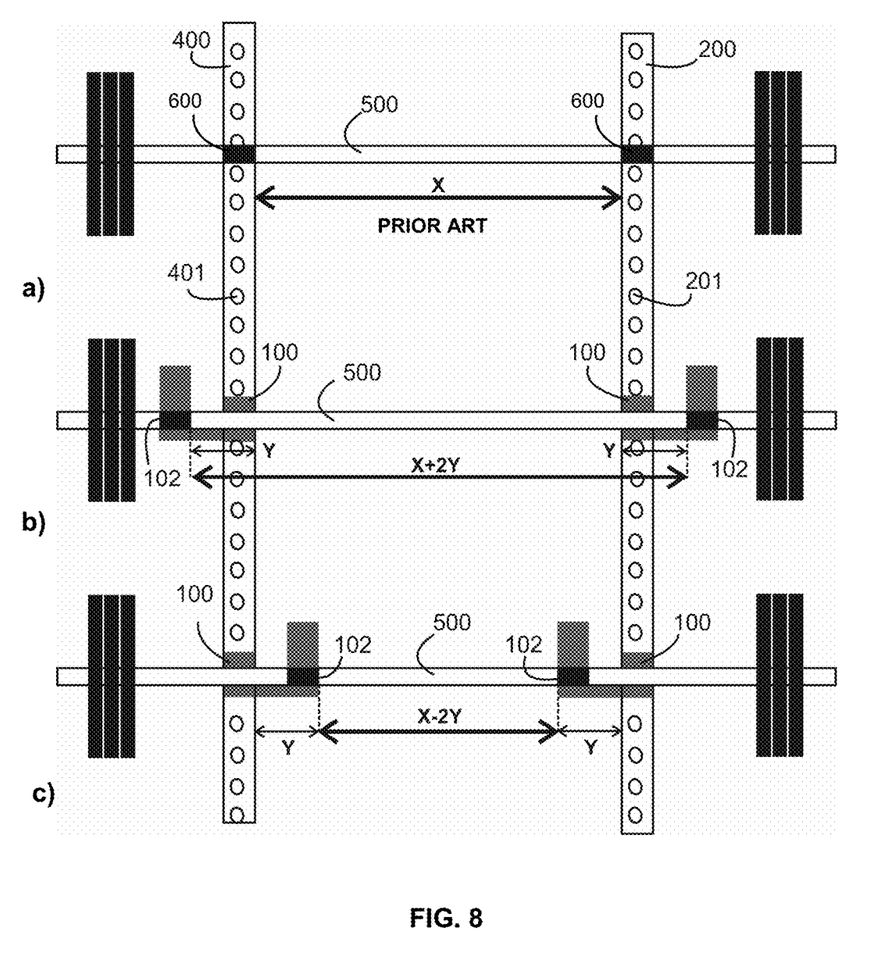

FIG. 8 (*a-c*) shows the stationary upright members 200 and 400 with different arrangement of weight bar holders. A weight bar holder 600 which is disclosed on the prior arts is placed in the same plane as the upright members 200 and 400 as shown in FIG. 8 (*a*), the grip length X is always constant and it is equal to the distance between the upright members 200 and 400. The weight bar holder 100, as shown in FIG. 8 (*b-c*), can change the grip length on the weight bar 500. In these drawings, X is the length between the two uprights 200 and 400 and Y is the length between one of the uprights 200 and 400 to the bar support member 102. If the bar support members 102 are placed outside of the cage, as shown in FIG. 8 (*b*), the grip length is increased to X+2Y. If the bar support members 102 are placed inside of the cage, as shown in FIG. 8 (c), the grip length is decreased to X−2Y.

In another embodiment of the present invention, the bar support member of the weight bar holder can be designed in any shape and size to catch the weight bar on the stationary or movable upright members. The bar support member 102 of the weight bar holder 100 in the FIGS. 3-5, have a curved surface on the catching edge 105. In another embodiment of the present invention, the bar support member has a flat surface or rounded surface.

In another embodiment of the present invention, the engagement member can have different type of engagement means with the upright member in the fitness equipment. The main concept of the present invention is to provide for different gripping lengths on a weight bar for different users.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A weight bar holder that is selectively vertically positionable on an upright bar of a fitness equipment, said upright bar having a plurality of vertically aligned apertures, said weight bar holder comprising:
   a) a body having a front side, and a left or a right side;
   b) a barbell-holder being connected to said front side of said body; and
   c) an extension member being connected to said left or said right side of said body;
   d) an engagement member being connected to said extension member and having an engagement means to engage with said upright bar, wherein said engagement member comprising:
      i) a three sided sleeve sized to receive said upright bar, said sleeve having a front wall, a right wall and a left wall, said front wall having a back side;
      ii) a plurality of cylindrical pegs projected outwardly from said back side of the front wall, said pegs sized to engage with the apertures on said upright bar; and
      iii) a locking means to lock said weight bar holder onto the upright bars.

2. The weight bar holder of claim 1, wherein said locking means being a spring loaded pop pin.

3. The weight bar holder of claim 1, wherein said body being a rectangular cuboid having a length, a width and a depth.

4. The weight bar holder of claim 3, wherein said depth keeps the barbell-holder away from the front side of the body and said upright bar, whereby a user holds the barbell at front side of the body away from said upright bar.

5. The weight bar holder of claim 1, wherein said extension member having a width to extend the barbell-holder further away to the left or the right of the body.

6. The weight bar holder of claim 1, wherein said extension member being a rectangular cuboid having a length, a width and a depth.

7. The weight bar holder of claim 6, wherein said width of said extension member being 1 inch to 10 inches.

8. The weight bar holder of claim 1, wherein said fitness equipment being selected from the groups consisting of racks, multi-functional racks, power-racks, half racks, partial racks, squat racks, self-standing half racks, double half racks, triple combo racks, squat stands, cages, power-cages, smith machines, bench presses and weight resistance machines.

* * * * *